United States Patent [19]

Alderman

[11] 4,411,463
[45] Oct. 25, 1983

[54] GOLF BALL RETRIEVING RAKE

[76] Inventor: Paul Alderman, 381 Shrewsbury St., Holden, Mass. 01520

[21] Appl. No.: 342,137

[22] Filed: Jan. 25, 1982

[51] Int. Cl.³ ............................................. A01D 7/06
[52] U.S. Cl. ............................... 294/19 A; 56/400.21; 273/162.13; 273/32 E
[58] Field of Search .................. 294/19 A, 53.5, 19 R, 294/2, 24, 51, 52, 53.5; 56/400.21, 400.12, 400.17, 400.19, 400.04; 273/32 F, 162 B, 162 E

[56] References Cited

U.S. PATENT DOCUMENTS 1,394,353  10/1921  Reinwald ...................... 56/400.21
4,289,344   9/1981  Mitchell ........................ 294/19 A Primary Examiner—James B. Marbert
Attorney, Agent, or Firm—Charles R. Fay

[57] ABSTRACT

A golf ball retriever comprising an elongated head and a series of spaced fingers extending from said head in a row, wherein the fingers are of general U-shape and are spaced apart in a line, the U-shaped fingers all facing in the same direction forming a series of scoops extending from the head.

4 Claims, 3 Drawing Figures

GOLF BALL RETRIEVING RAKE

BACKGROUND OF THE INVENTION

Many golf courses have small ponds or other water here and there and these are often muddy having a silt bottom with small stones, debris, etc. which, of course, is invisible because of the murky condition of the water. Some golfers utilize golf ball rakes having free-ended fingers like any rake or various kinds of scoops, etc. to retrieve balls in murky water but the trouble is that the free-ended fingers often get caught in crevices and on stones and debris and, instead of retrieving golf balls, they are more apt to retrieve pieces of the debris, small stones, etc., or become wedged in place.

It is the object of the present invention to provide a greatly improved golf ball retriever in the form of a rake having special new and improved fingers which are not apt to be hung up on stones, detritus, etc.

SUMMARY OF THE INVENTION

In the present case, if desired, a rakehead may be pivotally mounted on the end of a telescopic handle so that the rakehead can be placed parallel to the handle for storage in bag or other golf club receptacle, and swung out to a ninety degree position relative to the axis of the handle in operating position where a spring clip or the like holds the same in position while it is being used for raking in the pond to retrieve golf balls.

The teeth in the present case are unique in that they are in the form of closed end U-shaped members, the closed ends being rounded and the legs thereof being spaced apart a lesser distance than the diameter of a golf ball. Adjacent legs of adjacent U-shaped members may also be located a like distance. The U-shaped members are curved forwardly to a certain degree and actually act as scoops, scooping up the golf balls and bringing them toward the user of the device. The rounded ends of the U-shaped teeth tend to clear stones and debris and prevent hang-up of the rake on the bottom.

PREFERRED EMBODIMENT OF THE INVENTION

If desired, a telescoping handle 10 may be utilized, the handle being fastened to a generally flat plate 12 extending outwardly at either side of the handle. This flat may be fastened in any way to the handle as by a tubular member 14 and the flat plate 12 is provided at 16 with a pivot offset from the axis of the handle and pivoting the flat plate to the head 18 of the rake.

Figure 3:
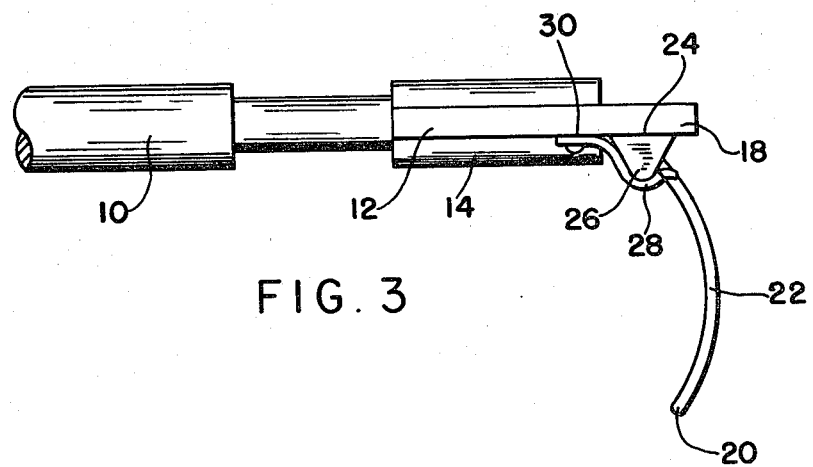
FIG. 3 is an end view looking in the direction of arrow 3 in FIG. 2.

The teeth 20 of the rake are in the form of U-shaped wire members having the ends thereof secured to the rake head or being formed as a single wire with multiple spaced fingers. The legs at 22 of the fingers 20 are spaced apart a slight distance less than the diameter of the usual golf ball and adjacent fingers 20 may have the adjacent legs 22 thereof spaced apart approximately the same distance. Fingers 20 are preferably forwardly curved as shown in FIG. 3 forming a series of scoops each one of which is of a nature to catch and urge a golf ball toward the user.

In this manner, the U-shaped fingers' closed ends will tend to avoid picking up or becoming stuck on stones, detritus, etc. and instead will more easily ride over the same urging whatever golf balls might be encountered in a direction toward the user.

Figure 1:
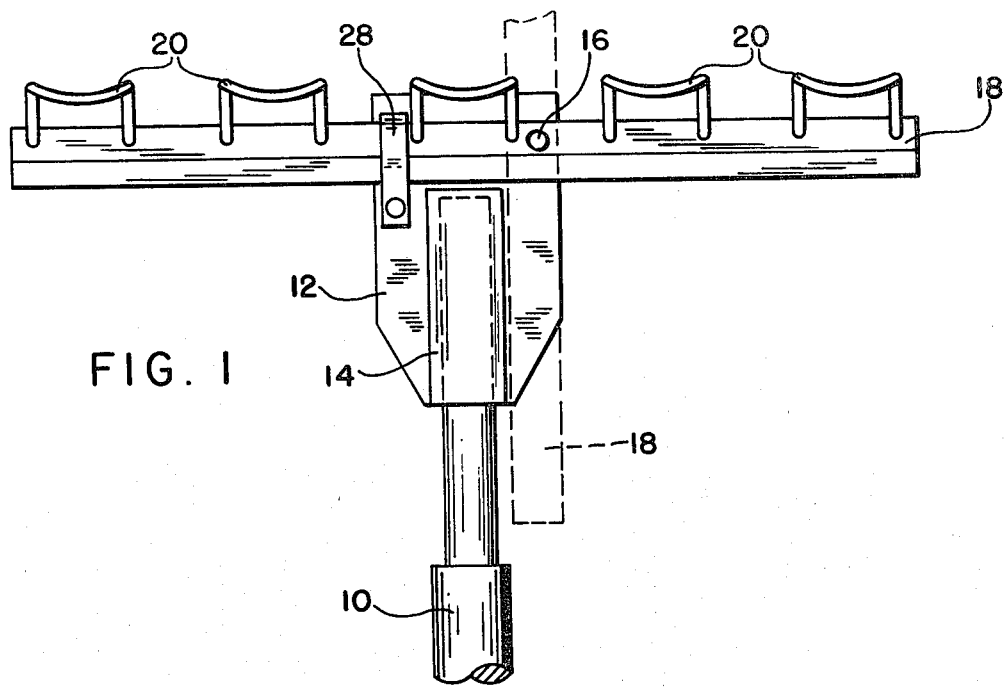
FIG. 1 is a view in front elevation showing the rake in solid lines in transverse operative condition relative to the handle; and in dotted lines it is shown as parallel to the handle for storage.
Figure 2:
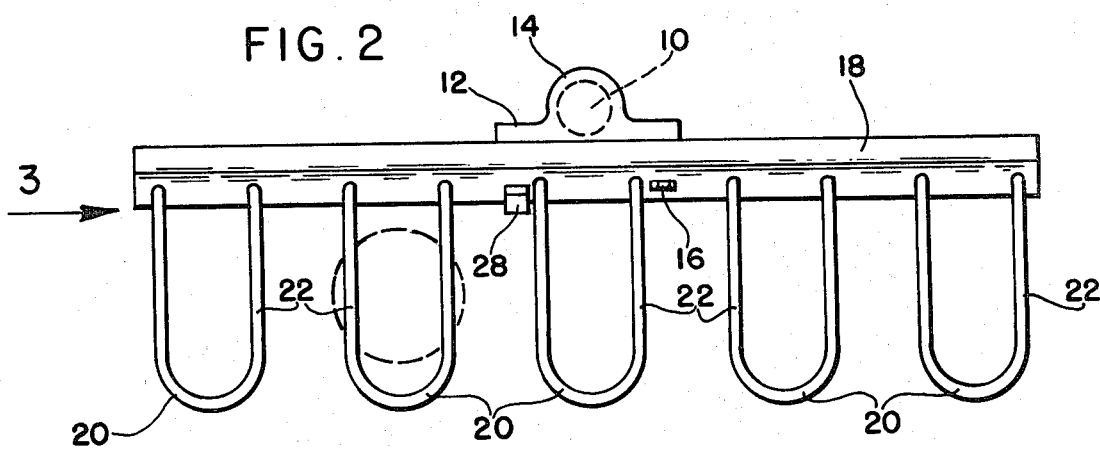
FIG. 2 is a front view of the rake head per se.

It will be noted that in the present case, the rakehead 18 is generally triangular in shape having a flat surface 24 for attachment to the flat plate 12 and also providing a rounded portion 26 to more easily accept and be retained by an S spring 28 fastened at one end as at 30 to the flat plate, thus making it a simple matter to both release the rakehead 18 so it can be moved into the dotted line storage position of FIG. 1 or to move it from the latter position to the transverse operative position as shown in FIG. 1 in solid lines. Since the pivot 16 is eccentric with respect to the axis of handle 10, it can be moved into the parallel position shown in dotted lines in FIG. 1 without interference and it may be equally easily swung around to the solid line position to be snap held by spring 28.

I claim:

1. A golf ball retriever comprising an elongated head and a series of spaced wire fingers extending from said head in a row,
   wherein the fingers are of general U-shape and are spaced apart in a line, the U-shaped fingers having rounded closed ends spaced from the head, said fingers being curved and having their convex aspects facing away from the head to engage the ground, all the fingers facing in the same direction forming a series of open spaced scoops extending from the head,
   there being legs forming parts of the U-shaped fingers, said legs being free ended, the free ends being embedded in the head, all legs being spaced apart a distance slightly less than the diameter of a golf ball and the legs of the next adjacent fingers being also spaced apart less than the diameter of a golf ball; the rounded closed ends of the U-shaped fingers being all that engages the ground,
   a handle for said head, a generally flat plate on the handle at one end thereof, a pivot offset from the axis of the handle on the plate, said rake head being pivoted with relation to said flat plate whereby the head may be moved into a parallel relationship with respect to the handle or into a transverse relationship with respect thereto.

2. The golf ball retriever of claim 1 including means latching the head in a position transversely of said handle.

3. The golf ball retriever of claim 1 wherein said U-shaped members extend from the head at least partially in the direction of the handle.

4. The golf ball retriever of claim 3 wherein said curved fingers present concave aspects thereof to the handle.